H. G. MORDAUNT.
FILM WINDING DEVICE.
APPLICATION FILED JAN. 24, 1917.
1,253,076.
Patented Jan. 8, 1918.
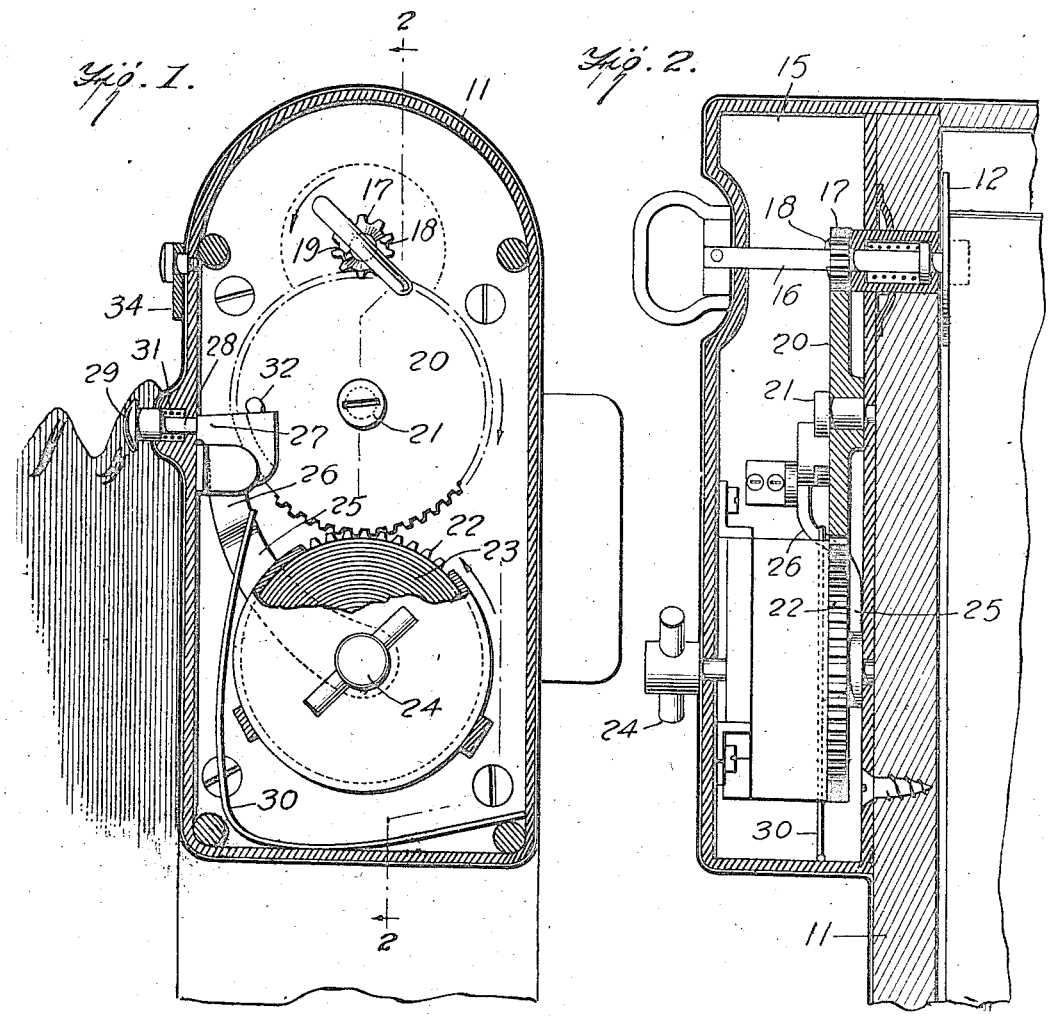
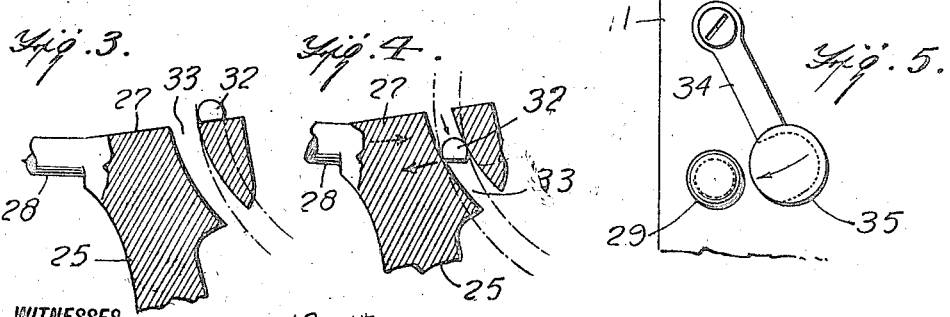
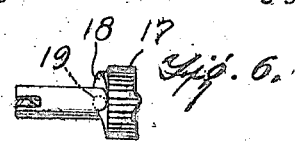
WITNESSES
INVENTOR
HARRY G. MORDAUNT,
BY
ATTORNEYS

UNITED STATES PATENT OFFICE.

HARRY G. MORDAUNT, OF SALT LAKE CITY, UTAH, ASSIGNOR OF ONE-HALF TO LITTLE GIANT MANUFACTURING & SALES COMPANY, OF OMAHA, NEBRASKA.

FILM-WINDING DEVICE.

1,253,076.     Specification of Letters Patent.     Patented Jan. 8, 1918.

Original application filed July 25, 1916, Serial No 111,124. Divided and this application filed January 24, 1917. Serial No. 144,276.

*To all whom it may concern:*

Be it known that I, HARRY G. MORDAUNT, a citizen of the United States, and a resident of Salt Lake City, in the county of Salt Lake and State of Utah, have invented a certain new and useful Improvement in Film-Winding Devices, of which the following is a specification.

My present invention relates generally to cameras, as described and shown in my application numbered 111,124, filed July 25, 1916, of which this is a division, and more particularly to film winding devices therefor, my object being to provide a simple, inexpensive arrangement whereby successive portions of a film may be advanced without the necessity of rotating the take-up roll by hand.

Generally speaking, the mechanism provided by my invention includes spring operated gearing associated with the take-up roll of a camera, and normally held against operation by a suitable locking arrangement, for actuation of the take-up roll, when said locking arrangement is released, to rotate the take-up roll for the usual purpose.

A further object of the invention is to provide a mechanism as above which will enable the user to manually actuate the take-up roll whenever it is desired to do so.

In the accompanying drawings, illustrating the preferred form of my invention, and forming a part of this specification:

Figure 1 is a vertical sectional view showing the mechanism for winding the film upon the take-up roll;

Fig. 2 is a section on the line 2—2 of Fig. 1;

Fig. 3 is a sectional view of a portion of the device for locking and releasing the winding mechanism, said device being shown in its normal position;

Fig. 4 is a view similar to Fig. 3, showing the device in position to permit of the operation of the winding mechanism;

Fig. 5 is a view of a contrivance for preventing the accidental operation of the locking device;

Fig. 6 is a fragmentary view of the take-up roll shaft and an associated part.

The invention illustrated in the accompanying drawing is what is now believed to be its preferred form, wherein one side wall of a camera, seen at 11, and its take-up roll at 12, has mounted on said side thereof adjacent the said take-up roll, a small auxiliary casing 15 for forming a compartment inclosing the winding mechanism for the take-up roll, which will be presently described in detail.

The usual shaft 16 for manually operating the take-up roll is constructed in the ordinary way and extends through the auxiliary casing 15, as shown in Fig. 2. Mounted upon the shaft 16 intermediate the ends thereof, is a small gear wheel 17, the outer face of which is provided with a ratchet surface 18 for engaging a pin 19, carried by the said shaft 16, so that when the gear 17 is rotated a similar motion will be transmitted to the shaft 16. By interlocking the shaft 16 and gear 17 in this manner, it will be apparent that, should it be desired, the shaft 16 may be manually rotated relative to the gear 17 in order to operate the take-up roll 12.

The mechanism for rotating the gear 17 preferably comprises a large gear 20, mounted upon the stub shaft 21 and meshing with the said gear 17, and also with another large gear 22, which is rotated by means of a small motor in the form of a coil spring 23 adapted to be wound by means of the stem 24 extending exteriorly of the casing 15.

A locking device is employed in connection with the winding mechanism for normally preventing operation thereof, and which when actuated will permit of the winding of the film upon the take-up roll 12, and said device preferably comprises a member 25 pivoted at one end upon the winding stem 24 between the gear 22 and the adjacent side of the casing 15.

The member 25 is curved intermediate its end, as indicated at 26, and is provided upon the extreme end thereof with an enlarged portion 27 having a stem 28 projecting therefrom and through the wall of the casing 15, and provided on its outer end with a thumb piece 29 whereby the operator may readily depress the stem 28 and thus swing the member 25 about its pivot. A leaf spring 30 and a coil spring 31, the former of which engages member 25 and the latter of which is wound about the stem 28, may be employed for normally retaining the member 25 in its locking position, as shown in Fig. 1.

Adjacent the periphery of the gear 20, the same is provided with a lateral projection 32 which, when the winding mechanism is inoperative, engages one edge of the enlarged portion 27 of the locking member 25, and the mechanism is thus prevented from operation. In order to release said winding mechanism the enlarged portion 27 of the member 25 is provided with a groove 33 which is eccentrically arranged relative to the axis of rotation of the gear 20.

When the thumb piece 29 is depressed by the operator, the upper end of the groove 33 is moved into registry with the pin 32, thus permitting the rotation of the gear 20. However, in view of the eccentric arrangement of the groove 33, it will be necessary for the operator to remove the pressure from the thumb piece 29 before the gear 20 will rotate. As soon as this pressure is relieved, the pin or projection 32 will ride along the groove 33 and in view of the arrangement of said groove the member 25 will be moved toward its normal position and the thumb piece again projects outwardly. After the projection 32 has disengaged from the slot 33, the gear 20 continues its rotation, driving the gear 17 and thus winding the film upon the roll 12. When the gear 20 has made one complete revolution, the film will have been positioned for the next exposure and the projection 32 will again contact the edge of the enlarged portion 27 of the locking member, thus preventing further operation of the winding mechanism.

In Fig. 5 there is shown a means for preventing the accidental operation of the member 25, and said means preferably comprises an arm 34 pivoted to the exterior of the casing 15 and having a cap 35 at its free end, which fits over the thumb piece 29 when the device is not in use.

I claim:—

1. In a camera having a film, the combination with a take-up roll, the mechanism including a gear for automatically winding the film on said roll, a depressible device in the path of movement of a portion of said gear for normally retaining said mechanism inoperative, and having a groove arranged eccentrically relative to the axis of rotation of said gear, when the device is in normal position and adapted to receive said portion thereof, whereby said device is returned to normal position as said gear is rotated.

2. In a camera having a film, the combination with a take-up roll; of a mechanism including a gear for automatically winding the film on said roll, a projection carried by said gear, a locking device normally contacting said projection for preventing rotation of said gear and having a groove therein arranged eccentrically relative to the axis of rotation of said gear for receiving said projection when said locking device is released, whereby said device is returned to normal position as said gear is rotated, and whereby said projection will again contact said device after a single rotation of said gear.

3. In a camera having a film, the combination with the take-up roll, of a spring actuated winding mechanism for the said take-up roll including a gear having a projection extending from one face thereof, a controlling lever pivoted at one end and having its opposite end provided with an externally projecting portion, and an internally projecting portion normally extending into the path of movement of said gear projection, said last-mentioned portion of said lever having a groove therein movable into registration with the gear projection and arranged eccentric to the axis of the gear, for the purpose described.

4. In a camera having a film, the combination with the take-up roll, of a winding mechanism therefor including a gear, a controlling lever having an externally projecting portion and an inner part coöperating with a portion of the gear to normally hold the latter against rotation, said inner part of said lever having a portion engageable by the said portion of the gear when the latter is released, to return the lever to normal position before the gear has completed its operative movement.

HARRY G. MORDAUNT.